US011528149B2

(12) United States Patent
Fradkin et al.

(10) Patent No.: US 11,528,149 B2
(45) Date of Patent: Dec. 13, 2022

(54) ROOT-LEVEL APPLICATION SELECTIVE CONFIGURATION

(71) Applicant: BeyondTrust Software, Inc., Ridgeland, MS (US)

(72) Inventors: Simon Fradkin, Cheshire (GB); Steven Joruk, Stretford (GB)

(73) Assignee: Beyondtrust Software, Inc., Ridgeland, MS (US)

( * ) Notice: Subject to any disclaimer, the term of this patent is extended or adjusted under 35 U.S.C. 154(b) by 277 days.

(21) Appl. No.: 16/859,242

(22) Filed: Apr. 27, 2020

(65) Prior Publication Data

US 2020/0344067 A1 Oct. 29, 2020

Related U.S. Application Data

(60) Provisional application No. 62/838,973, filed on Apr. 26, 2019.

(51) Int. Cl.
*H04L 9/32* (2006.01)
*G06F 16/16* (2019.01)
(Continued)

(52) U.S. Cl.
CPC .............. *H04L 9/3247* (2013.01); *G06F 8/61* (2013.01); *G06F 9/54* (2013.01); *G06F 16/137* (2019.01);
(Continued)

(58) Field of Classification Search
CPC ... H04L 9/3247; H04L 9/3271; H04L 63/102; H04L 63/20; H04L 67/06; H04L 67/1097;
(Continued)

(56) References Cited

U.S. PATENT DOCUMENTS 4,959,861 A 9/1990 Howlette
5,535,383 A 7/1996 Gower
(Continued)

FOREIGN PATENT DOCUMENTS

JP 2007010666 1/2007
WO 2007005638 6/2006
(Continued)

OTHER PUBLICATIONS

International Search Report and Written Opinion dated Apr. 17, 2014 for International PCT Pat. Appl. No PCT/US2014/011729.
(Continued)

*Primary Examiner* — Khoi V Le
(74) *Attorney, Agent, or Firm* — Morris, Manning & Martin, LLP; Daniel E. Sineway, Esq.; Adam J. Thompson, Esq.

(57) ABSTRACT

Systems and methods for root-level application selective configuration for managing installation of applications in a file system include at least one computing device and an agent. The at least one computing device can receive selections from a user for a file and for actions desired to be executed on the file. Instead of requiring a particular privilege level for the user, the agent can be provided privileges based on a policy file associated with the selected file, thereby allowing the selectable actions to be executed via the agent. The agent can be executed by the at least one computing device and register with an OS during a boot sequence. The agent can receive a selection of a file and render a context menu based on metadata from an associated policy file. The context menu can include one or more badges providing an indication of executable actions for the selected file.

22 Claims, 6 Drawing Sheets

(51) Int. Cl.
*G06F 16/13* (2019.01)
*G06F 8/61* (2018.01)
*G06F 9/54* (2006.01)
*H04L 9/40* (2022.01)
*H04L 67/06* (2022.01)
*H04L 67/1097* (2022.01)

(52) U.S. Cl.
CPC .......... *G06F 16/164* (2019.01); *G06F 16/168* (2019.01); *H04L 9/3271* (2013.01); *H04L 63/102* (2013.01); *H04L 63/20* (2013.01); *H04L 67/06* (2013.01); *H04L 67/1097* (2013.01)

(58) Field of Classification Search
CPC ........ G06F 8/61; G06F 16/137; G06F 16/164; G06F 16/168; G06F 16/16; G06F 16/122; G06F 16/11; G06F 9/4401
See application file for complete search history.

(56) References Cited

U.S. PATENT DOCUMENTS

| | | |
|---|---|---|
| 5,553,143 A | 9/1996 | Ross et al. |
| 5,579,222 A | 11/1996 | Bains et al. |
| 5,655,081 A | 8/1997 | Bonnell et al. |
| 5,671,412 A | 9/1997 | Christiano |
| 5,689,638 A | 11/1997 | Sadovsky |
| 5,719,941 A | 2/1998 | Swift et al. |
| 5,737,600 A | 4/1998 | Geiner et al. |
| 5,742,757 A | 4/1998 | Hamandani et al. |
| 5,754,763 A | 5/1998 | Bereiter |
| 5,793,952 A | 8/1998 | Limsico |
| 5,862,260 A | 1/1999 | Rhoads |
| 5,944,825 A | 8/1999 | Bellemore et al. |
| 5,978,594 A | 11/1999 | Bonnell et al. |
| 6,026,397 A | 2/2000 | Sheppard |
| 6,029,145 A | 2/2000 | Barritz et al. |
| 6,105,027 A | 8/2000 | Schneider et al. |
| 6,182,212 B1 | 1/2001 | Atkins et al. |
| 6,237,144 B1 | 5/2001 | Delo |
| 6,282,653 B1 | 8/2001 | Berstis et al. |
| 6,289,341 B1 | 9/2001 | Barney |
| 6,308,274 B1 | 10/2001 | Swift |
| 6,345,386 B1 | 2/2002 | Delo et al. |
| 6,363,391 B1 | 3/2002 | Rosensteel, Jr. |
| 6,363,499 B1 | 5/2002 | Frank, Jr. et al. |
| 6,389,589 B1 | 5/2002 | Mishra et al. |
| 6,397,381 B1 | 5/2002 | Delo et al. |
| 6,405,318 B1 | 6/2002 | Rowland |
| 6,408,336 B1 | 6/2002 | Schneider et al. |
| 6,412,070 B1 | 6/2002 | Van Dyke et al. |
| 6,418,554 B1 | 7/2002 | Delo et al. |
| 6,434,535 B1 | 8/2002 | Kupka et al. |
| 6,446,077 B2 | 9/2002 | Straube et al. |
| 6,446,211 B1 | 9/2002 | Colvin |
| 6,460,142 B1 | 10/2002 | Colvin |
| 6,466,932 B1 | 10/2002 | Dennis et al. |
| 6,484,264 B1 | 11/2002 | Colvin |
| 6,502,195 B1 | 12/2002 | Colvin |
| 6,566,081 B1 | 5/2003 | Liao et al. |
| 6,591,228 B1 | 7/2003 | Hall et al. |
| 6,684,259 B1 | 1/2004 | Discavage |
| 6,769,074 B2 | 7/2004 | Vaitzblit |
| 6,817,017 B2 | 11/2004 | Goodman |
| 6,836,794 B1 | 12/2004 | Lucovsky et al. |
| 6,857,067 B2 | 2/2005 | Edelman |
| 6,915,287 B1 | 7/2005 | Felsted et al. |
| 6,920,567 B1 | 7/2005 | Doherty et al. |
| 6,950,818 B2 | 9/2005 | Dennis et al. |
| 6,954,738 B2 | 10/2005 | Wang et al. |
| 6,963,981 B1 | 11/2005 | Bailey et al. |
| 6,978,379 B1 | 12/2005 | Goh et al. |
| 6,983,317 B1 | 1/2006 | Bishop et al. |
| 7,000,118 B1 | 2/2006 | Murthy et al. |
| 7,028,079 B2 | 4/2006 | Mastrianni et al. |
| 7,035,910 B1 | 4/2006 | Dutta et al. |
| 7,146,638 B2 | 12/2006 | Malcolm |
| 7,162,649 B1 | 1/2007 | Ide et al. |
| 7,272,625 B1 | 7/2007 | Hannel et al. |
| 7,284,043 B2 | 10/2007 | Feinleib et al. |
| 7,321,300 B2 | 1/2008 | Friedrich et al. |
| 7,330,712 B2 | 2/2008 | Kirkup et al. |
| 7,350,204 B2 | 3/2008 | Lambert et al. |
| 7,398,532 B1 | 7/2008 | Barber et al. |
| 7,461,398 B2 | 12/2008 | Aaron |
| 7,472,420 B1 | 12/2008 | Pavlyushchik |
| 7,506,038 B1 | 3/2009 | Perrone et al. |
| 7,673,323 B1 | 3/2010 | Moriconi |
| 7,783,673 B2 | 8/2010 | Schneider et al. |
| 7,784,101 B2 | 8/2010 | Verbowski et al. |
| 7,797,752 B1 | 9/2010 | Vaidya et al. |
| 7,904,479 B2 | 3/2011 | Zuk |
| 7,950,051 B1 | 5/2011 | Spitz et al. |
| 7,962,709 B2 | 6/2011 | Agrawal |
| 8,006,088 B2 | 8/2011 | Peretti |
| RE42,762 E | 9/2011 | Shin |
| 8,127,316 B1 | 2/2012 | Binotto et al. |
| 8,205,239 B1 | 6/2012 | Satish |
| 8,286,241 B1 | 10/2012 | Yeo |
| 8,346,626 B2 | 1/2013 | Robertson |
| 8,453,244 B2 | 5/2013 | Dai et al. |
| 8,543,683 B2 | 9/2013 | Kiciman et al. |
| 8,560,661 B2 | 10/2013 | Nazarov |
| 8,655,307 B1 | 2/2014 | Walker et al. |
| 8,719,190 B2 | 5/2014 | El-Rafei et al. |
| 8,738,906 B1 | 5/2014 | Sampath et al. |
| 8,776,168 B1 | 7/2014 | Gibson et al. |
| 8,806,494 B2 | 8/2014 | Russinovich et al. |
| 8,955,119 B2 | 2/2015 | Zhao |
| 9,197,660 B2 | 11/2015 | Sun et al. |
| 9,208,338 B2 | 12/2015 | Patidar et al. |
| 2001/0011254 A1 | 8/2001 | Clark |
| 2001/0041989 A1 | 11/2001 | Vilcauskas et al. |
| 2001/0049796 A1 | 12/2001 | Roth et al. |
| 2002/0007363 A1 | 1/2002 | Vaitzblit |
| 2002/0010867 A1 | 1/2002 | Shcaefer et al. |
| 2002/0165724 A1 | 1/2002 | Blankesteijn |
| 2002/0026591 A1 | 2/2002 | Hartley et al. |
| 2002/0091645 A1 | 7/2002 | Tohyama |
| 2002/0095671 A1 | 7/2002 | Delo et al. |
| 2002/0112186 A1 | 8/2002 | Ford et al. |
| 2002/0129277 A1 | 9/2002 | Caccavale |
| 2002/0166052 A1 | 11/2002 | Garg et al. |
| 2002/0169747 A1 | 11/2002 | Chapman et al. |
| 2002/0178233 A1 | 11/2002 | Mastrianni et al. |
| 2003/0023587 A1 | 1/2003 | Dennis et al. |
| 2003/0023874 A1 | 1/2003 | Prokupets et al. |
| 2003/0033535 A1 | 2/2003 | Fisher et al. |
| 2003/0140043 A1 | 7/2003 | Hotchkiss et al. |
| 2003/0145317 A1 | 7/2003 | Chamberlain et al. |
| 2003/0159055 A1 | 8/2003 | Robbins |
| 2003/0172291 A1 | 9/2003 | Judge et al. |
| 2003/0177074 A1 | 9/2003 | Ramanathan |
| 2003/0191868 A1 | 10/2003 | Espino |
| 2003/0233581 A1 | 12/2003 | Reshef et al. |
| 2004/0090930 A1 | 5/2004 | Lee et al. |
| 2004/0098610 A1 | 5/2004 | Hrastar |
| 2004/0107368 A1 | 6/2004 | Colvin |
| 2004/0117628 A1 | 6/2004 | Colvin |
| 2004/0117631 A1 | 6/2004 | Colvin |
| 2004/0117644 A1 | 6/2004 | Colvin |
| 2004/0117663 A1 | 6/2004 | Colvin |
| 2004/0117664 A1 | 6/2004 | Colvin |
| 2004/0128551 A1 | 7/2004 | Walker |
| 2004/0153658 A1 | 8/2004 | Gunyakti et al. |
| 2004/0162880 A1 | 8/2004 | Arnone et al. |
| 2004/0168090 A1 | 8/2004 | Chawla et al. |
| 2004/0199609 A1 | 10/2004 | Papatla et al. |
| 2004/0215650 A1 | 10/2004 | Shaji et al. |
| 2004/0230623 A1 | 11/2004 | D'Angelo et al. |
| 2004/0239946 A1 | 12/2004 | Kane et al. |
| 2005/0015623 A1 | 1/2005 | Williams |
| 2005/0021980 A1 | 1/2005 | Kanai |

(56) References Cited

U.S. PATENT DOCUMENTS

| | | |
|---|---|---|
| 2005/0068901 A1 | 3/2005 | Nurminen |
| 2005/0110965 A1 | 5/2005 | Hendriks et al. |
| 2005/0182969 A1 | 8/2005 | Ginter et al. |
| 2005/0203881 A1 | 9/2005 | Sakamoto et al. |
| 2005/0262503 A1 | 11/2005 | Kane et al. |
| 2005/0273399 A1 | 12/2005 | Soma et al. |
| 2006/0026195 A1 | 2/2006 | Gu et al. |
| 2006/0026679 A1 | 2/2006 | Zakas |
| 2006/0047794 A1 | 3/2006 | Jezierski |
| 2006/0064474 A1 | 3/2006 | Feinleib et al. |
| 2006/0095768 A1 | 5/2006 | Hoshino |
| 2006/0165060 A1 | 7/2006 | Dua |
| 2006/0174323 A1 | 8/2006 | Brown |
| 2006/0221077 A1 | 10/2006 | Wright |
| 2006/0248585 A1 | 11/2006 | Ward et al. |
| 2006/0271789 A1 | 11/2006 | Satomura |
| 2007/0013921 A1 | 1/2007 | Pellemans et al. |
| 2007/0028303 A1 | 2/2007 | Brennan |
| 2007/0043943 A1 | 2/2007 | Peretti |
| 2007/0057763 A1 | 3/2007 | Blattner et al. |
| 2007/0067833 A1 | 3/2007 | Colnot |
| 2007/0094735 A1 | 4/2007 | Cohen et al. |
| 2007/0169199 A1* | 7/2007 | Quinnell ............ H04L 63/1433 726/25 |
| 2007/0174824 A1 | 7/2007 | Relyea et al. |
| 2007/0180509 A1* | 8/2007 | Swartz ................. G06F 9/4406 726/9 |
| 2007/0199068 A1 | 8/2007 | Russinovich |
| 2007/0255957 A1 | 11/2007 | Arnone et al. |
| 2008/0015448 A1 | 1/2008 | Keely et al. |
| 2008/0040606 A1 | 2/2008 | Narayanan et al. |
| 2008/0040797 A1 | 2/2008 | Schwartz |
| 2008/0056560 A1 | 3/2008 | Yu et al. |
| 2008/0109871 A1 | 5/2008 | Jacobs |
| 2008/0148342 A1 | 6/2008 | Aiyagari et al. |
| 2008/0168545 A1 | 7/2008 | Inoue et al. |
| 2008/0172743 A1 | 7/2008 | Aaron |
| 2008/0313171 A1 | 12/2008 | Galvin |
| 2009/0097008 A1 | 4/2009 | Mos et al. |
| 2009/0106556 A1 | 4/2009 | Hamid |
| 2009/0150989 A1 | 6/2009 | Hoey et al. |
| 2009/0271863 A1 | 10/2009 | Govindavajhala et al. |
| 2009/0300057 A1 | 12/2009 | Friedman |
| 2010/0023754 A1 | 1/2010 | Peled et al. |
| 2010/0100948 A1 | 4/2010 | Delia |
| 2010/0107227 A1 | 4/2010 | Hicks |
| 2010/0111300 A1 | 5/2010 | Kido et al. |
| 2010/0121929 A1 | 5/2010 | Lin |
| 2010/0212010 A1 | 8/2010 | Stringer et al. |
| 2010/0217837 A1* | 8/2010 | Ansari ................ H04L 12/2814 709/224 |
| 2010/0228749 A1 | 9/2010 | Castro et al. |
| 2010/0242082 A1 | 9/2010 | Keene et al. |
| 2010/0251369 A1* | 9/2010 | Grant .................... G06F 21/554 726/23 |
| 2010/0257539 A1 | 10/2010 | Narayanan |
| 2010/0299292 A1 | 11/2010 | Collazo |
| 2010/0306236 A1 | 12/2010 | Cychosz et al. |
| 2010/0313035 A1 | 12/2010 | Turbin et al. |
| 2010/0325703 A1 | 12/2010 | Etchegoyen |
| 2010/0325707 A1 | 12/2010 | Iverson et al. |
| 2011/0082845 A1* | 4/2011 | Padala ............. G06F 16/24564 707/E17.014 |
| 2011/0179284 A1 | 7/2011 | Suzuki et al. |
| 2011/0209193 A1 | 8/2011 | Kennedy |
| 2011/0271114 A1 | 11/2011 | Baysinger |
| 2011/0296502 A1* | 12/2011 | Peretti .................. H04L 63/105 726/20 |
| 2012/0017262 A1 | 1/2012 | Kapoor et al. |
| 2012/0072968 A1 | 3/2012 | Wysopal et al. |
| 2012/0185910 A1 | 7/2012 | Miettinen et al. |
| 2012/0233656 A1 | 9/2012 | Rieschick et al. |
| 2012/0284793 A1 | 11/2012 | Steinbrecher et al. |
| 2012/0323853 A1 | 12/2012 | Fries et al. |
| 2013/0031633 A1 | 1/2013 | Honig et al. |
| 2013/0061300 A1 | 3/2013 | Novak et al. |
| 2013/0097706 A1 | 4/2013 | Titonis et al. |
| 2013/0246423 A1 | 9/2013 | Bhargava et al. |
| 2014/0012851 A1 | 1/2014 | Shmueli |
| 2014/0047544 A1 | 2/2014 | Jakobsson |
| 2014/0273965 A1 | 9/2014 | Raleigh et al. |
| 2014/0325591 A1 | 10/2014 | Delia et al. |
| 2015/0047025 A1 | 2/2015 | Beauregard et al. |
| 2015/0128274 A1 | 5/2015 | Giokas |
| 2015/0205692 A1 | 7/2015 | Seto |
| 2016/0065594 A1 | 3/2016 | Srivastava |
| 2016/0226904 A1 | 8/2016 | Bartos |
| 2017/0123987 A1* | 5/2017 | Cheng ................ G06F 15/7821 |

FOREIGN PATENT DOCUMENTS

| | | |
|---|---|---|
| WO | 2008049005 | 4/2008 |
| WO | 2012001667 | 1/2012 |

OTHER PUBLICATIONS

International Search Report and Written Opinion dated Jul. 10, 2014 for International PCT Pat. Appl. No. PCT/US2014/016976.

International Search Report and Written Opinion dated Apr. 24, 2017 for International PCT Pat. Appl. No. PCT/US2016/068622.

International Search Report and Written Opinion dated Apr. 11, 2017 for International PCT Pat. Appl. No. PCT/US2016/068623.

International Search Report and Written Opinion dated May 23, 2012 for International PCT Pat. Appl. No. PCT/US2012/024638.

International Search Report and Written Opinion dated Jan. 5, 2017 for International PCT Pat. Appl. No. PCT/US2016/054874.

International Search Report and Written Opinion dated Jan. 18, 2017 for International PCT Pat. Appl. No. PCT/US2016/054839.

* cited by examiner

ROOT-LEVEL APPLICATION SELECTIVE CONFIGURATION

CROSS-REFERENCE TO RELATED APPLICATIONS

This application claims priority to U.S. Provisional Patent Application Ser. No. 62/838,973, filed Apr. 26, 2019, titled "SYSTEMS AND METHODS FOR ROOT-LEVEL APPLICATION SELECTIVE CONFIGURATION," which is hereby incorporated by reference in its entirety.

TECHNICAL FIELD

The present disclosure relates generally to managing file action privileges in a computing environment, and more particularly to providing indications of executable actions for files based on one or more policies.

BACKGROUND

In conventional computing file systems, a relatively high privilege level, such as an administrator-level, is generally required in order to manage the installation and uninstallation of applications especially when those actions require changes to system files or resources. This security model is generally problematic in scenarios where a non-administrator needs access to applications, files, restricted folders, etc. In these scenarios, the non-administrator typically needs to be provided with the administrator privileges in order to obtain access to the target resource, which in most managed computing environments (e.g., an enterprise environment) is a cumbersome, tedious, and time-consuming process, and also presents security risks. Furthermore, a user may be unaware of which actions may or may not be executed with respect to a particular file. For example, a user can navigate through folders that can each contain files and folders; however, the display of the folder does not provide the user with information regarding actions that can be executed for each of the files. In addition, executable actions for files in a computer network may change, for example, in response to administrative decisions and other policies; however, enacting changes to executable actions based on privileges may require updating each individual computing device in the network.

Therefore, there is a long-felt but unresolved need for a mechanism to manage and provide indications of executable actions in a computing environment without providing overarching high-level access or permissions (e.g., administrator privileges) or requiring individual updating of each computing device in the computing environment.

BRIEF SUMMARY OF DISCLOSURE

According to aspects of the present disclosure, there is provided a computer system, a computer-implemented method, and a computer-readable storage medium as set forth in the disclosed embodiments. Additional features will be apparent from the description herein. There now follows a summary of various aspects and advantages according to certain embodiments. This summary is provided as an introduction to assist those skilled in the art to more rapidly assimilate the detailed discussion herein and is not intended in any way to limit the scope of the claims that are appended hereto.

Aspects of the present disclosure allow for an agent running on a computing device to be selectively provided with or given credentials or an elevated privilege status, for installing applications, uninstalling applications, modifying application file paths, or performing other actions, etc. The agent can coordinate with a policy server to provide a user with visuals, such as badges and context menus, indicating actions that can be taken with respect to various files and folders. The indicated actions are actions that can be performed at a privilege level of the agent, as opposed to a lesser privilege level of the user. Thus, the present systems and processes allow an agent to apply predetermined policies to a selected file or folder and, based on the applied policies, present a user with visuals indicative of privileged actions the agent may perform on behalf of the user. By providing a privileged agent for determining and causing execution of actions based on policies, an administrator is not required to provide the user with administrator credentials or elevate a privilege level of the user.

The policies can include rules stored in one or more policy files in storage, device memory, or at a policy server, where the policy server may be operatively/communicatively connected to the agent. In a particular embodiment, aspects or characteristics of the policies defined within the policy server for various files in a folder may be visually presented to the user of the computing device via badges and/or context menus on a GUI presented on the computing device display. In certain embodiments, the badges may visually communicate to the user of the computing device in which applications or application directories are available for a specific action, such as being accessed/modified by the user. In one embodiment, a badge may include an icon, or the like, in which a green icon may indicate that the application is installable, and a red icon may indicate that the application is not installable. However, in particular embodiments, the icons may include various images and/or shapes, and are not to be limited to specific colors.

As will be described below in association with various exemplary embodiments, the agent may present the user with badges and context menus regarding the permissible actions for a file based on the policies associated therewith. The agent can receive a notification from an operating system in response to a user opening a folder or other system location that includes one or more folders and/or one or more files. The user opening the folder or other system location can cause the computing device to render a user interface showing the contents thereof. Prior to the display of the user interface to the user, the agent can retrieve policies associated with each folder and/or file. The policies can be retrieved via a policy server from a data store. The policies can alternatively be retrieved from storage or memory on the computing device, or from metadata associated with a user account of the user. The agent can determine allowable actions for each file and/or folder. Based on the determined actions, the agent can cause the computing device to render badges on each rendering of the files and/or folders. The color, patterning, or other visual element of each badge can indicate to the user what particular actions may be taken for each file and/or folder at the privilege level of the agent 123 (e.g., the badges may not be indicative of actions that may be performed with other software applications running on the computing device).

The agent can receive a notification from the operating system in response to a user selecting a file or folder. For example, a user can right-click a file from a folder, the right-click causing the notification of the agent. The agent can query a policy server for one or more policies that are applied to determine allowable actions corresponding to the selected file. In some embodiments, the agent retrieves the policies from storage or memory of the computing device, or from metadata associated with the user account of the user. The agent can determine which privileged actions, if any, are executable and/or available for the file. Based on the determinations, the agent can cause the computing device to render a context menu presenting a visualization of the determined actions. In some embodiments, the context menu is presented in response to selecting an item in the file system, or the context menu is presented in response to a "secondary click" or a "long press" on a mouse or trackpad. In certain embodiments, the context menu allows for a user to specify an application-related action, such as opening an application, installing an application, searching the application package contents, etc. In one or more embodiments, policies can be policy files that include configuration data for determining whether one or more actions, such as, for example, "Install," "Delete," "Modify," "Upgrade," and/or other options are allowable and thus presentable to the user. For example, Install and Delete options may be presented within the context menu in response to a user initiating display of the context menu via a secondary click, or the like. In one example, the badges and/or context menus are presented within the "Finder" application in macOS, which provides a GUI for organizing and manipulating the file system.

In at least one embodiment, an application programming interface (API) may be utilized to provide for extensibility and allow for developers to access or hook into a context menu presented when selecting an item in the file system. In one example, the API provides a method for receiving notifications relating to when a particular file or folder is rendered on a display in response to a user selection. In response to receiving the notification, an agent may query the policy server to determine actions for each folder or file that is rendered on the display. The agent can cause the folder and/or files to be marked with badges, allowing for the user to know which actions are available for each folder and/or file. In one embodiment, either a badge image for a single action may be presented, or different badges may be presented for available actions and functionality (e.g., a badge for Installable items, a badge for deletable items, a badge for items that are both installable and deletable, etc.).

BRIEF DESCRIPTION OF DRAWINGS

For a better understanding of the disclosure, and to show how example embodiments may be carried into effect, reference will now be made to the accompanying drawings in which.

DETAILED DESCRIPTION OF DRAWINGS

Figure 1:
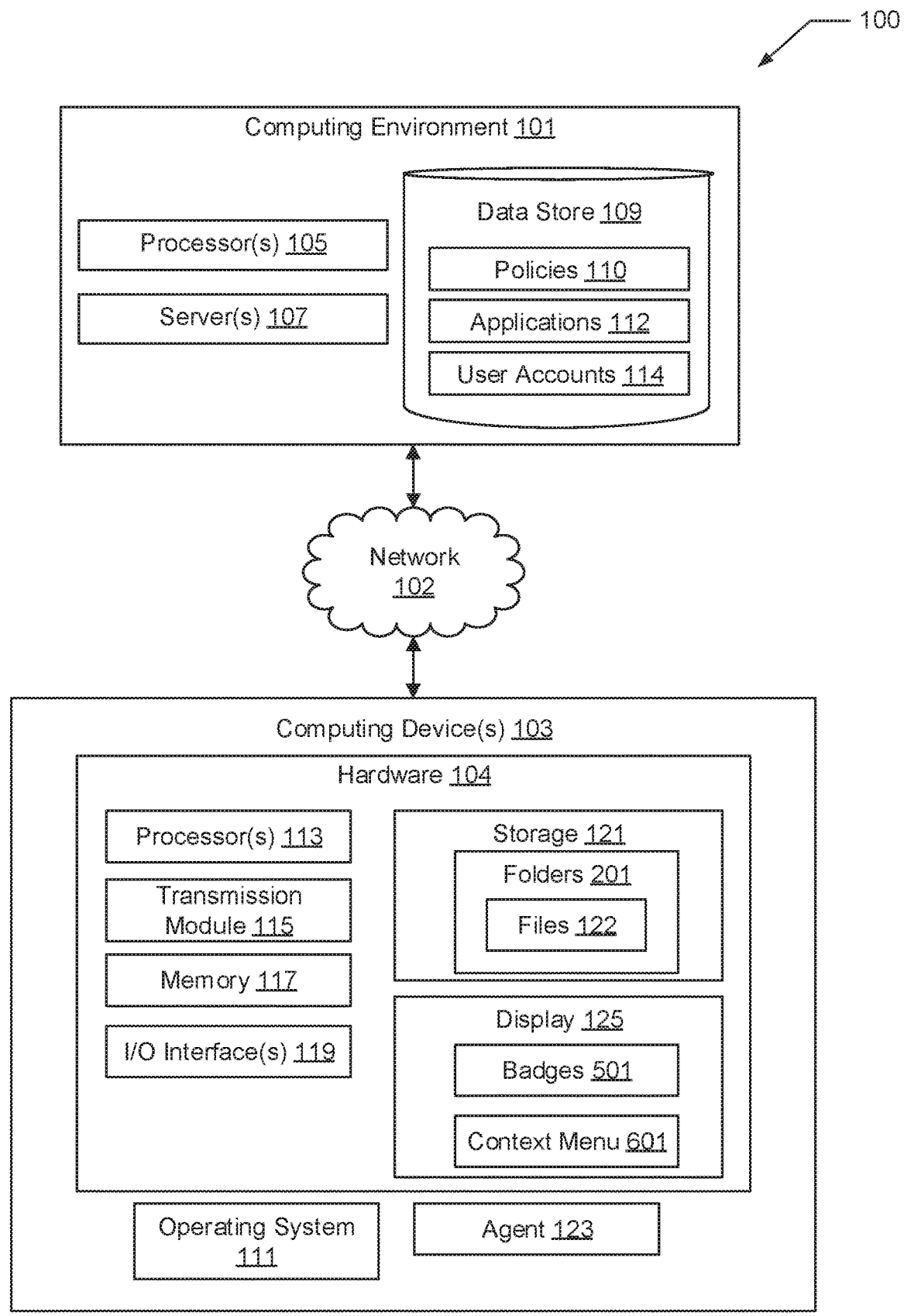
FIG. 1 is a schematic overview of an exemplary networked environment according to one aspect of the present disclosure.
Figure 2:
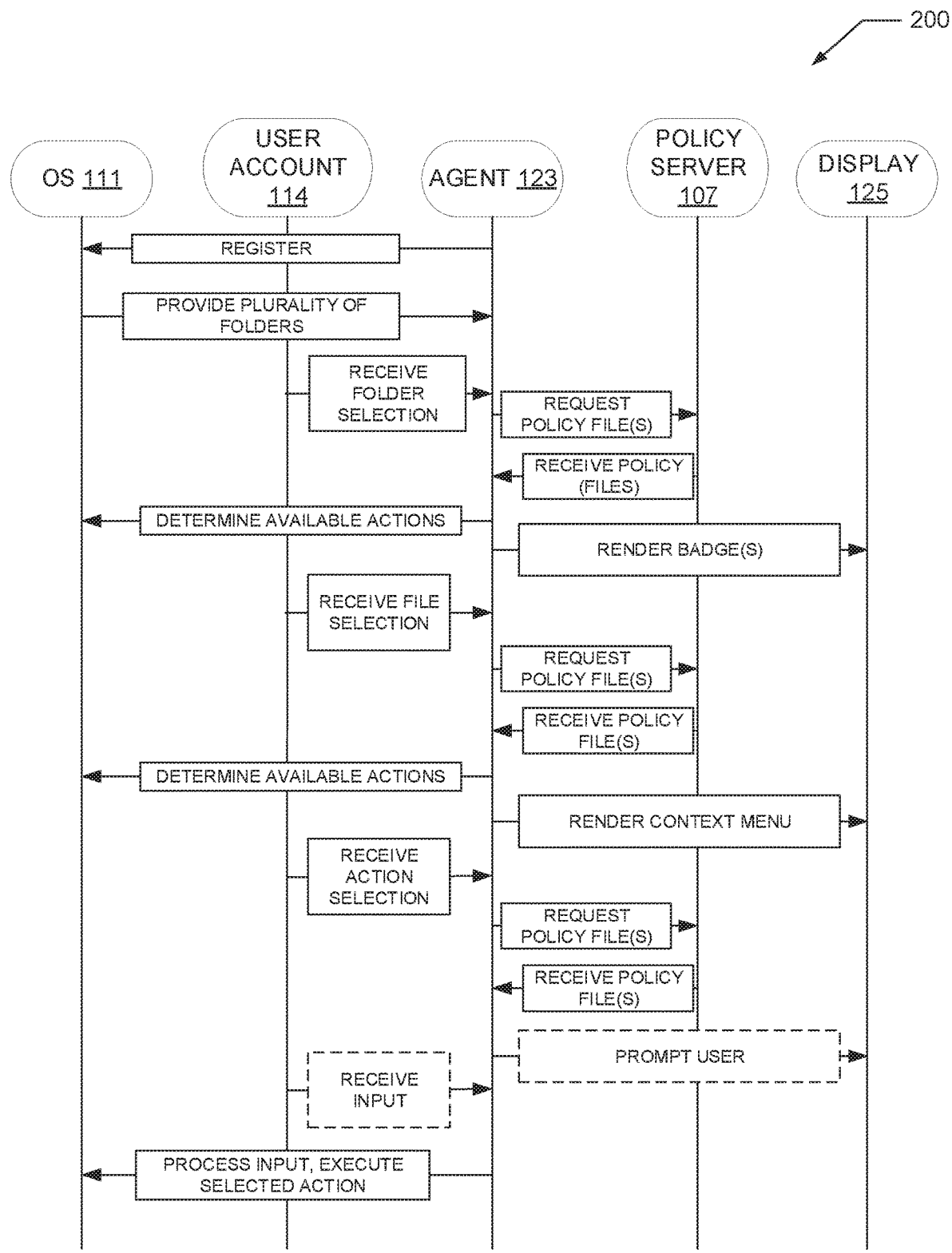
FIG. 2 is a sequence diagram of exemplary functionalities described herein according to one aspect of the present disclosure.

The following description illustrates example embodiments of a mechanism for indicating, to a user, available actions for applications on a computer device. The example mechanism is simple and convenient for a user, and is relatively lightweight to implement. Further, the example mechanism will uphold the security of computer devices while enabling applications to be installed by users themselves and with minimal support or supervision. Many other advantages and improvements will be appreciated from the discussion herein.

Overview

Aspects of the present disclosure allow for a user of a computing device to be presented with visual indications of available actions that can be taken for a particular file or folder based on aspects or characteristics of policies associated therewith. The visual indications may be visually presented on the computing device via badges, or the like, on a GUI presented on the computing device display. In certain embodiments, the badges may visually communicate to the user of the computing device which applications or application directories have available actions for the current user account. In one embodiment, a badge may include an icon, or the like, in which a first icon may indicate that the application is installable, a second icon may indicate that the application is not installable.

An agent running on a computing device can apply one or more policies to a selected file or folder to determine allowable actions therefore. The agent can determine the allowable actions upon being notified that a user selected a particular folder or file, the selection causing the computing device to render the particular folder or file on a display. The agent can cause the rendering of badges or other visual elements on the display based on one or more allowable actions determined by the agent by applying policies to the selected file or folder. The policies can be included in policy files that are stored on the computing device or that are received from a server.

In one example, folders and files within a selected folder may be presented within the "Finder" application in macOS, which provides a GUI for organizing and manipulating the file system. The agent can determine allowable actions for reach folder and file, and can also determine and cause rendering of a badge associated with the determined actions for each folder and file. Furthermore, a programming application programming interface (API) may be utilized, such as "Finder Sync Extension," that provides for extensibility and allows for developers to access or hook into a context menu presented when selecting an item in the file system. In the example, the context menu can be presented in response to selecting one of the files or folders in the GUI. The selection can be a "secondary click" on a mouse or trackpad, or may be another predetermined input. The rendered context menu can include the determined actions for the folder or file, such as opening an application, installing an application, searching the application package contents, etc.

In one embodiment, the policy file may include configuration data for determining which applications may present various actions to specific user accounts or groups of user accounts. For example, these actions may be presented within the context menu in response to a user initiating display of the context menu via a secondary click, or the like. In particular embodiments, the Finder Sync API may provide a method for receiving notifications relating to when a Finder item is made visible in the Finder. In response to receiving the notification, the extension may query the policy server for a list of actions available for the item. In various embodiments, these items may be marked with badges in the context menu or Finder GUI, allowing for the user to know which items may utilize the functionality of the extension. In one embodiment, either a single badge image may be presented, or different badges may be presented according to the available functionality (e.g., a badge for Installable items, a badge for Deletable items, a badge for items that are both Installable and Deleteable, etc.).

According to various aspects of the present disclosure, in response to the user accessing a particular file or folder, information relating to the accessed item, along with may be passed/transmitted to an agent, which may be a daemon. In one embodiment, the agent may transmit details of the request to a policy server along with other information such as an identifier of a current user account, a hash or signature of one or more requested items, security information, and other information. The policy server may determine one or more actions based on the current policy configuration. The policy server may return the result to the agent. In some embodiments, the policies may be stored locally and the agent or extension may determine available actions without consulting a policy server. In one or more embodiments, the agent performs the determination of the one or more actions by applying the policies, which are retrieved from storage or memory, or are received from the policy server.

In one embodiment, if gated access is configured, the agent may initiate the display of one or more message dialogs to the user for requesting information from the user (e.g., via Defendpoint). In various embodiments, the requests may include reason dialog, challenge-response, authentication dialog, and block messages. In a particular embodiment, a dialog response from the user may be communicated back to the agent. In various embodiments, a valid response may initiate the agent's determining a particular action to be allowable, or causing the agent to facilitate execution of a selected action. In some embodiments, an invalid response may prevent the action from being allowable and thus prevent the action from being presented as an option to the user. In various embodiments, an invalid response can cause the agent to notify the user of an action not being allowed. In some embodiments, the policy server may provide the agent with answers to the requests such that the agent may authorize or prevent the action from occurring based on the response without consulting a policy server.

Exemplary Embodiments

Referring now to the figures, for the purposes of example and explanation of the fundamental processes and components of the disclosed systems and methods, reference is made to FIG. 1, which illustrates an exemplary networked environment 100 for performing various functions described herein. As will be understood and appreciated, the exemplary networked environment 100 and associated elements shown in FIG. 1 represents merely one approach or embodiment of the present system, and other aspects are used according to various embodiments of the present system.

The networked environment 100 can include a computing environment 101 in communication with one or more computing devices 103 via a network 102. The computing environment 101 can include one or more processors 105 for processing transmissions from the one or more computing devices 103, and can include one or more servers 107 for receiving the transmissions via the network 102. In various embodiments, the computing environment 101 includes a data store 109 including one or more databases for storing various information described herein. In at least one embodiment, the data store 109 stores information including, but not limited to, policies 110, applications 112, and user accounts 114. The network 102 can be a private network, a virtual private network, an intranet, a cloud, the Internet, or other network schemas.

Each computing device 103 may take any suitable form factor. As examples, the device 103 might be a desktop computer, a portable computing device, laptop, tablet, smartphone, wearable device, or an emulated virtual device on any appropriate host hardware. The computer device 103 includes hardware 104, which suitably includes memory 117, processors 113 (CPU central processor units), I/O input/output interfaces 119 (e.g. NIC network interface cards, USB universal serial bus interfaces, etc.), storage 121 (e.g. solid-state non-volatile storage or hard disk drive), and other suitable elements for performing the various processes described herein. The storage 121 can store one or more files 122, including applications, etc., and one or more of files 122 can be organized into folders. In at least one embodiment, one or more, or all of the hardware 104 are implemented virtually, for example, in a cloud computing infrastructure.

An operating system 111 can run on the hardware 104 to provide a runtime environment for execution of user processes, such as actions executed with respect to one or more files 122 stored in the memory 117, in the storage 121, or in one or more locations accessible to the computing device 103 via the network 102. The runtime environment can provide resources such as installed software, system services, drivers, and files. In one example, a file includes an application for an email client that is used to send and receive email messages. Many other types of files for various software applications are available and can be provided according to the needs of the user of each computing device 103.

The computer device 103 can include an agent 123. The agent 123 may include one or more software and/or hardware modules, such as executables, dynamic libraries (dylib in macOS), plug-ins, add-ins, add-ons or extensions. The agent 123 may operate as a daemon, which runs as a background process on the computer device. Alternately, when considering the Windows family of operating systems, the agent 123 may be a Windows service. The agent 123 is configured to operate in cooperation with the operating system 111 and the files 122. In particular, the agent 123 may provide and coordinate core capabilities for the security of the computer device. The agent 123 suitably performs functions for implementing privilege management and application control.

The operating system 111 can apply a security model wherein access privileges are based on the agent 123 and policies 110. The operating system 111 may define privilege levels appropriate to different classes of users, or groups of users, and then apply the privileges of the relevant class or group to the particular agent associated with the logged-in user account 114 (e.g. ordinary user, super-user, local administrator, system administrator, and so on). The agent 123 configured in a boot sequence of the computer device 103 and can be associated with a user identity and password. The user credentials may be validated locally or via a remote service such as a domain controller. The agent 123 thus acts, in coordination with a policy server 107, as a security principal in the security model. The operating system 111 can grant appropriate privileges to the agent 123 to manage and control privileges based on policies 110 for files 122 (e.g., including processes and applications) which execute in the security context of the agent 123.

When considering privilege management, it is desirable to implement a least-privilege access security model, whereby each user is granted only a minimal set of access privileges. However, many applications require a relatively high privilege level, such as a local administrator-level, in order to install and operate correctly. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device and software thereon, leading to errors or corruption within the computer device. Further, an infection or malware may access the computer device with the deliberate intention of subverting security or causing damage, such as by encrypting important data content and then demanding a ransom. The risk of this malicious activity can be reduced or prevented by assigning a relatively low privilege level to the user accounts 114 that access the computing device, such as a primary user account 114. The agent 123 can coordinate with the operating system 111 and selectively enable access to higher privilege levels (e.g. a local administrator-level, when needed to perform certain tasks). Conversely, the agent 123 in some examples is also able to downgrade the privilege level for one or more actions, so that certain tasks are carried out at a privilege level lower than that of the current user account 114.

For execution control, the agent 123 can be arranged to ensure that only authorized files 122 are executed on the computer device 103. For example, the agent 123 can be governed by policies 110 that can be based on trusted file types, digital signatures, certification, and/or other factors, thereby automatically stopping unapproved files 122 from running, or being installed, uninstalled, or otherwise modified. There may be a sophisticated set of policies 110 which define rules and conditions under which each file 122 may operate, in relation to the intended host computing device 103 and the relevant user account 114. Thus, in one example, the file 122 will only be allowed to execute on the computer device 103 if permitted by the policies 122 as retrieved by the agent 123 from the data store 109 via a server 107. A server 107 can be configured as a dedicated policy server 107 that coordinates policy 110 querying with the agent 123 and/or the transmission module 115.

In one example, the agent 123 can access a policy file stored in the data store 109. The policy file stores a set of policies 110 which define permissions and responses of the agent 123 to requested actions or tasks (e.g., such as a request by a user to install an application). A policy server 107 may be provided to make policy decisions based on the policies 110. The policy server 107 may operate by receiving a policy request message, concerning a requested action and related meta-information, and returning a policy result based thereon. Alternatively, the policy server 107 may provide the policies 110 to the computing device 103 and the agent 123 can determine a policy result based thereon. In one example, the agent 123 is configured to capture a set of identities, and may then provide these identities as part of the policy request. The agent 123 can utilize the identities to make a decision using the policies as to whether to perform one or more actions. Such identities may include a user identity (UID) of the relevant user account, a group identity (GID) of a group to which that user account belongs, a process identity (PID) of a current process which has initiated the action or task in question, and/or a process identity of a parent process (PPID). Suitably, the policy server 107 or the computing device 103 determines an outcome for the request based on the provided set of identities relevant to the current policy request.

In one example, the agent 123 can store the policies 110 as a structured file, such as an extensible mark-up language XML file. The policies 110 can be suitably held locally on the computing device 103, ideally in a secure system location which is accessible to the agent 123. The secure system location may be otherwise inaccessible by the user account 114. Updates to the policies 110 in the policy file may be generated elsewhere on the network 102. In one example, a management console on one of the servers 107 is used to pushed or pull policies 110 to and from each instance of the agent 123 on each computing device 103. The policies 110 can be readily updated and maintained, ensuring consistency for all computing devices 103 across the network. In this way, the agent 123 can be robust and manageable for a large-scale organization with many thousands of individual computing devices 103. Also, the agent 123 can leverage policies 110 that have been developed in relation to application control, such as defining user groups or user roles and related application permissions. The agent 123 can extend those same rules to privilege management and vice versa.

The agent 123 can cause the computing device 103 to render badges 401 (see FIG. 4) and context menus 501A, 501B (see FIGS. 6A-B) on a display 125. The badges 401 can indicate executable actions that can be performed with respect to a particular file 122 based on one or more policies 110 associated therewith. Similarly, the context menus 501A, 501B can include menu options for executable actions that can be performed based on the one or more policies 110, and may include other executable actions associated with other software running on the computing device 103. The user can select actions from the context menus 501A, 501B. In one example, prior to rendering a user-selected folder and files 122 therein, the agent 123 can determine whether to render one or more badges for each file 122 or folder in the folder. The agent 123 can coordinate with a policy server 107 to retrieve policies 110 associated with the selected folder. The agent 123 can render one or more badges on an icon for each file 122 to indicate actions available for the file 122. As an example, the agent 123 can determine whether the file 122 is executable based on policy data associated therewith. In a similar example, prior to rendering a context menu in response to a user selecting a particular file 122, the agent 123 can determine one or more executable actions for the particular file 122 based on policies 110 associated therewith.

In some examples, the agent 123 is configured to perform custom messaging. In particular, agent 123, whether acting directly or via a cooperating proxy or plugin, may present a message dialog to the user. This message dialog may be presented in a terminal or window from which a current action of interest was invoked by or on behalf of the user account 114. Thus, the custom messaging may be presented on a display 125 of the computing device 103 for interaction with the user in control of the user account 114. Input from the user account 114 may be returned to the agent 123 for evaluation. Hence, the agent 123 is able to interact with the user with a rich set of customizable messages.

In one example, the custom messaging may include at least one of: a confirmation, a challenge-response, a query for information, and a reason. In more detail, the confirmation may present a dialog that receives input, such as a binary yes/no type response, allowing the user to confirm that they do indeed wish to proceed and providing an opportunity to double-check the intended action. The custom messaging conveniently allows specific text, e.g. as set by policies 110, to be included in the dialog, such as reminding the user that their request will be logged and audited. As another option, the custom messaging may provide specific block messages, explaining to the user why their request has been blocked, thus enabling improved interaction with the user. The custom messaging and include one or more input options, such as a text input, a button, and other inputs.

In one example, the custom messaging may require additional authentication to be presented by the user in order to proceed with the requested action. As an example, the additional authentication may require the user to again enter their username and password credentials or may involve one or more of the many other forms of authentication (e.g. a biometric fingerprint or retinal scan) as will be appreciated by those skilled in the art. The challenge-response also allows alternate forms of authentication to be employed, such as a multi-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policies 110 to meet the evolving needs of a large user population.

Notably, custom messaging allows the agent 123 to provide a rich and informative set of interactions with the users. Each of these individual custom messaging actions may be defined in the policies 110. The custom messaging may eventually result in a decision to allow or block the requested action. An appropriate allow or block operation is then carried out as required.

The agent 123 may perform auditing in relation to all requests or at least certain requests. The auditing may include recording the customized messaging, and may include recording an outcome of the request. Audit reports may be extracted or uploaded from each computing device 103 via the servers 107 at any suitable frequency. Each of these auditing functions may be defined in the policies 110.

In some examples, the agent 123 can be configured to perform passive handing of a request. The request can be presented to the originally intended recipient, which may occur within the operating system 111, and any responses may be returned transparently. In one example, passive handling is defined by the policies 110. The agent 123 can meanwhile audit the requests which were handled passively, again consistent with the policies 110. Notably, this passive handling function allows the action to proceed while the requesting user process or application is unaware of the agent 123 as intermediary. Advantageously, default behavior of system is maintained for those actions that the agent 123 determines should have passive handling. Also, there is now a fail-safe option, in that the system will maintain an expected behavior for actions that are passively handled. This passive handling is useful particularly in the event that a particular user account or request is not specified in the policies 110 because default behavior is still enacted. Hence, the system can now quickly and safely supersede the original behavior for specific situations, allowing rapid responses and network-wide consistency when needed, while still enabling existing legacy functionality and behavior to continue in place for other actions, users and/or devices, as appropriate.

The file 122 can include the resources that are required in order for execution on the computing device 103, using the runtime environment provided by the operating system 111. In one example, the file 122 can be included in a folder 201 (file directory), which allows one or more related files 122 to be grouped together. The folder 201 can be stored in a file system of the storage 121, such as a disk image on the computing device. In one example, the file system is a disk image on the computing device, the disk image being a distinct portion of the storage 121. The disk image can be a file 122 representing the structure and contents of a storage device, similar to a physical storage device such as a hard disk drive, optical disk (DVD) or solid-state storage (USB flash drive). When such a physical storage device is coupled to the computing device 103, then the device is mounted by the operating system 111 to become available to other components within the computing device 103. The agent 123 can capture meta-data related to the disk image, which may include any one or more of: a file name of the disk image, a hash of the disk image and a signature. The agent 123 can utilize the meta-data when determining whether to perform an action on a file stored on the disk image based on one or more policies. In some examples, the disk image can be signed, e.g. using a code signing identity, to reliably establish an identity of the author or source of the disk image and content therein. Other metadata may also be used, such as a current path where the file 122 or folder 201 is located, and information relevant to the current session (UID, etc.) and the current computer device (host machine details).

Once a folder on a disk image is opened, the agent 123 may suitably examine contents of the folder 201. If a folder 201 and/or files 122 are found to be contained in the opened folder 201, then the agent 123 determines actions via one or more policies for the folders 201/files 122, such as, for example, via policy server 107. Again, the agent 123 may gather appropriate metadata relating to the identified folder 201 and/or files 122, such as a signature, the identified current user, machine, etc. In some examples, the operating system may provide API function calls that return the desired information, such as Bundle Name, Bundle Creator, Bundle Type, Version, Bundle Executable. Also, if the bundle 224 is signed, then these functions may also allow the certificate and hash to be retrieved. Alternatively, the agent 123 may itself generate a hash of the content of the folder 201 and/or files 122, which can then be matched against records in the policies 110 of hashes for known and trusted folders 201 and files 122. For example, third-party functions such as QCryptographicHash allow a hash to be generated by the agent 123, suitably by integrating through all files 122 in the folder 201. Also, the agent 123 may employ custom messaging to obtain additional information, or provide additional information, in relation to the folder 201 and/or files 122, prior to determining whether or not to proceed with an action. For example, the agent 123 may prompt the user to confirm that they wish to proceed with installing or deleting the identified file 122.

If an action of the file 122 is approved, the agent 123 may initiate the process of performing the action for the file 122, such as by installing the file 122. It can be appreciated that the file 122 can correspond to a plurality of compressed or packaged files 122. In one example, applications are intended to reside in the system folder "/Applications" in macOS. Some actions may require enhanced privileges. As an example, copying the file 122 into a system location may require privileges associated with the administrator group. If the current user account 114 is a member of the administrator group then the copy can be performed directly, such as by selecting a context menu item. However, it is desirable for the current user account 114 not to be a member of the administrator group, consistent with the least privilege principle. That is, the current user account 114 is excluded from a privilege level which is required to perform many actions or operations, such as install or delete applications. However, the agent 123 (e.g., a daemon) may have appropriate (higher) privileges and thus is able to cause the copy operation to be successfully performed by the operating system 111. In some embodiments, the agent 123 operates as a daemon with escalated privileges to perform the action. In other embodiments, the agent 123 communicates with a daemon that has escalated privileges to perform the action. In some embodiments, the privileges of the agent 123 or daemon are escalated only for the purpose of performing the action and then de-escalated again immediately following. For example, the agent 123 may cause the permissions of a daemon to be escalated to perform the action.

In some examples, the agent 123 is able to use file copy functions that are provided natively by the operating system 111 (e.g. NSFileManager in macOS including NSFileManager copyItemAtPath: toPath: error:), or appropriate third-party functions (e.g. Qt's QFile::copy). Hence, with this mechanism, standard users are now able to cause an install action to occur via the agent 123.

In particular embodiments, rather than immediately causing a selected action, the agent 123 may query the policy server 107 for configuration data from the policies 110 relating to the selected action. In some embodiments, the selected action may not be authorized for the particular user account based on the policies 110, while in other embodiments the action may be performed in response to the user providing additional information, performing a two-step authentication, etc. In various embodiments, before causing the selected action, the agent 123 can determine that the particular file 122 associated therewith is notarized by a trusted digital authority. As an example, the agent 123 can verify that the trusted digital authority signed the file using a public key of the trusted digital authority.

Figure 3:
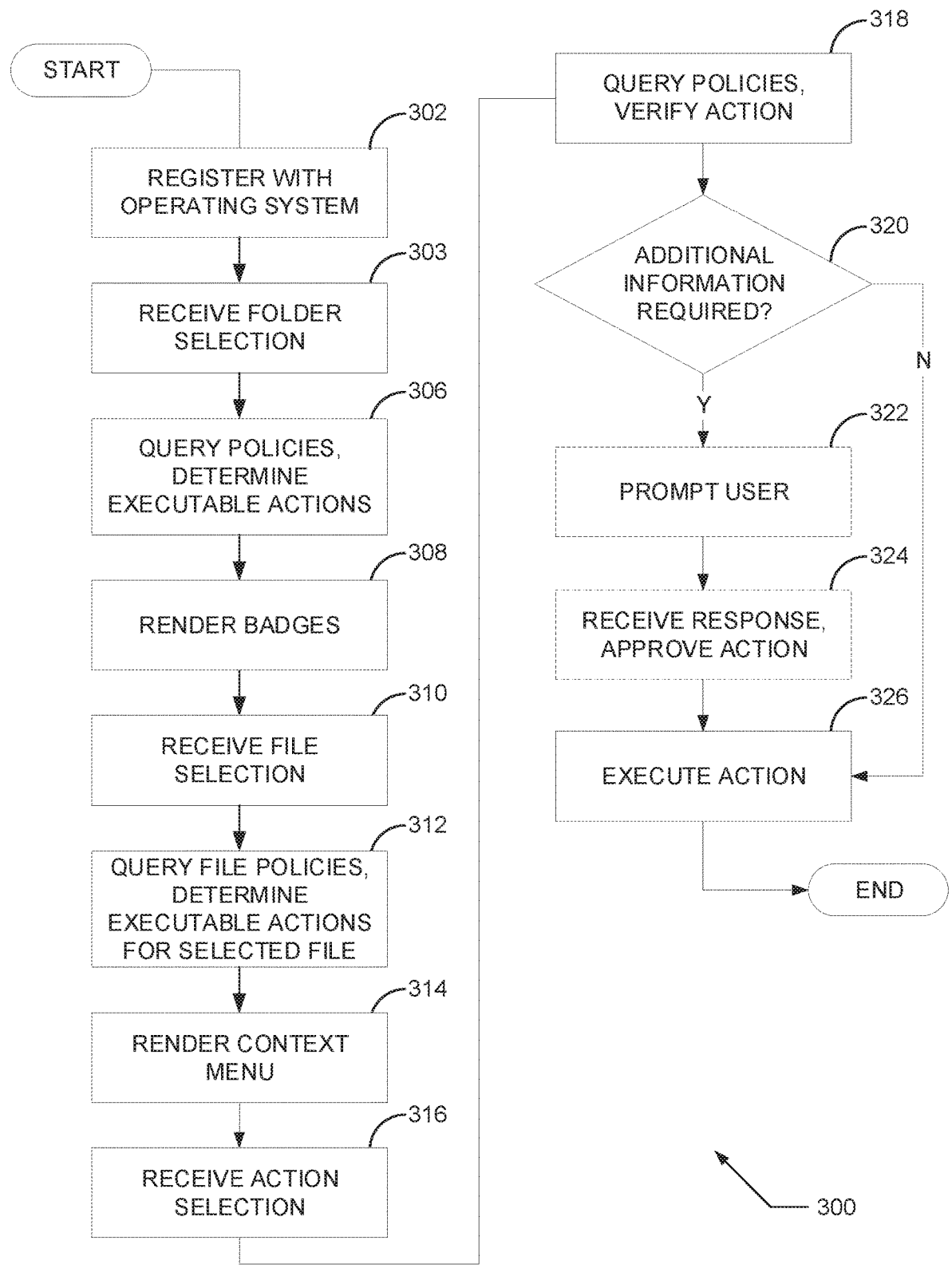
FIG. 3 is a flowchart of an exemplary file execution control process according to one aspect of the present disclosure.

FIG. 3 is a sequence diagram 200 which illustrates exemplary event sequence and example interactions of the agent 123 with the user account 114 and the operating system 111. In this detailed example, when the agent 123 is started (usually at boot), it requests notifications from the operating system 111 (e.g. macOS) of whenever disk images have requested to be mounted and when folder 201 and/or files 122 are selected. At some later point in time, the user account 114 selects or opens a folder 201, which causes the agent 123 to be notified by the operating system 111. The agent 123 consults the policy server 107 for executable actions for files 122 in the selected folder 201. It can be appreciated that the policy server 107 may deploy the one or more policies 110 to the agent 123 on initialization or at an earlier time, and the agent 123 can determine whether the action is authorized using the policies 110 without communicating or consulting with the policy server. As can be appreciated, when a user clicks to open a folder, delay in providing the list of files in the folder would disrupt a user experience. To reduce delay, the agent 123 may send a message with an identifier associated with a version or a signature for the set of policies 110 to verify that the policies 110 are the most current version. If the identifiers or signatures match, the agent 123 can proceed without further communications thereby minimizing data transmissions between the agent 123 and the policy server 107. Based on policies 110, the agent 123 can determine actions available for each file 122 in the selected folder 201. Based on the available actions, the agent 123 can cause the computing device 103 to render one or more badges 401 on a display 125 based on the determined actions. As an example, the agent 123 may communicate with an extension to cause the badges to be rendered.

The agent 123 can process a selection from the user account 114 for a particular file 122 in the folder 201. The selected file 122 may or may not have a particular badge. The agent 123 can utilize the previously acquired policies 110 or query the policy server 107 for the policies 110 associated with the selected file 122. The agent can verify or determine the one or more available actions for the selected file 122. In some embodiments, the policies 110 may have a varying degree of validation or verification requirements for 1) rendering badges, 2) adding an option for an action to a context menu, and 3) performing the action from a selected option. The validation requirements may be tailored based on time to perform. For example, performing RSA analysis to verify signatures of hundreds of files in order to show the proper badges while showing a folder's contexts is resource-intensive. To solve this problem, the policies 110 may 1) specify that rendering a badge on a spreadsheet application file 122 that indicates a particular action is available requires a first level of validation, 2) specify that creating a context menu item to perform the action once the file 122 is selected requires a second level of validation, and 3) specify that performing the action based on a selection of the context menu item requires a third level of validation. The first level may include verifying the vendor and application name, the second level may include verifying a checksum of the application, and a third level may include verifying a digital signature of the file 122.

Similarly, each querying of the policy server 107 may be performed at a particular level of granularity. For example, when the agent 123 may determining actions for the rendering of badges 401 in a selected folder 201, the agent 123 may inspect only high-granularity policies 110 (e.g., "are any files from this source allowable?"). In another example, when the agent 123 is determining actions for the rendering of a context menu, the agent 123 may inspect more granular policies 110 for a selected file 122. In another example, when the agent 123 is determining whether a selected action is executable, the agent 123 may inspect all policies 110 for the selected action and file 122. Because the networked system 100 can include hundreds to thousands of computing devices 103 and millions of files 122 and folders 201, a conservative hierarchy of policy inspection allows for minimization of computing resources required to perform each step in the processes described herein.

The agent 123 can cause the computing device 103 to render a context menu 501A (or another context menu) based on the determined actions. The agent 123 can process a selection for a particular action for the user account 114. The agent 123 can determine whether the action is authorized based on the policies 110. The agent 123 may query the policy server 107 for one or more policies 110 associated with the action or utilize the policies 110 stored locally.

Based on rules of one or more policies 110, the agent 123 can perform additional verification/validation steps if necessary. For example, the agent 123 can prompt the user account for additional information or actions. The agent 123 can cause the computing device 103 to render a challenge and response on the display 125. In another example, the agent 123 can initiate a multi-factor authentication process.

In another example, the agent 123 can require the user to provide login information, such as a username and password, before executing the selected action. As determined by the policies 110, the agent 123 can cause performance (e.g., execution) of the selected action based on privileges of the agent 123 (e.g., as opposed to lower privileges of the user account 114, which may be insufficient for controlling such processes).

With reference to FIG. 3, shown is an exemplary file execution control process 300. At step 302, an agent 123 registers with an operating system 111. The agent 123 can register during a boot sequence of the operating system on the computing device 103 and/or in response to the computing device 103 receiving login credentials for a user account 114 associated with the computing device 103. During registration, the agent 123 may call one or more operating system functions or application programming interfaces (APIs) to be notified of file and folder accesses. In some embodiments, the agent 123 may register an extension with the operating system to receive callbacks, interrupts, messages, notifications, or the like. The agent 123 may be initialized as a daemon or spawn a separate daemon during initialization. In some embodiments, the agent 123 can query the policy server 107 to download current policies for the user account during or shortly after registration and initialization.

At step 304, the computing device 103 receives a selection for a folder 201. In one example, the computing device 103 renders a folder GUI on a display 125 including one or more folders 201. The selection can be received through one or more I/O interfaces 119. The selection can include receiving a touch, such as a click, or multiple touches.

At step 306, the agent 123 determines available actions for one or more files 122 within the opened folder 201. To determine the available actions, the agent 123 can analyze and apply the policies 110 for the computing device 103. The policies may be associated with the user account, the computing device 103, the opened or selected folder 201, the files 122, or a combination thereof. In some embodiments, the agent 123 may query the policy server 107 for the policies 110 when the folder 201 is opened. The step 306 may occur prior to the computing device 103 rendering a display of one or more files 122 included in the selected folder 201. In some embodiments, the rendering of the contents of the folder 201 may be delayed until the agent 123 determines the available actions and assigns a badge to each file 122. In other embodiments, the contents of the folder 201 can be rendered without the badges initially, and the agent 123 can update the badges once the agent 123 determines the available actions and assigns a badge to each file 122. The agent 123 can store a history of badges assigned to files 122. In some embodiments, the agent 123 can initially apply a last used badge from the history to the files 122 until the agent 123 determines the available actions and assigns an updated badge to each file 122.

The agent 123 can verify a source of the files 122 when determining the available action. The operating system 111 or agent 123 may maintain a data store that contains the source of all downloaded or loaded files 122 into the storage 121 in a secure place. The agent 123 can query the data store to determine where the file 122 originated from. The agent 123 may authorize one or more actions according to the policies 110 if the file 122 originated from a trusted source. Conversely, the agent 123 may deny one or more actions according to the policies 110 if the file 122 originated from an untrusted or unknown source. In some embodiments, the agent 123 may quarantine the file 122 if the source of the file 122 is untrusted. For example, the agent 123 may determine that a source of a particular file 122 should be from a particular vendor according to the policies 110, but that the particular file 122 originated from a source known to distribute malicious content. Based on the identified source and the policies 110, the agent 123 may quarantine the file 122.

In one embodiment, the agent 123 can perform a background process upon loading of the policies 110 by applying the policies 110 to each file 122 in a file system of the storage 121 to generate a default badge for each file 122. Further, the agent 123 can perform the background analysis of the files 122 in the storage 121 upon receiving one or more updated policies 110 from the policy server 107. In some embodiments, the background process can be limited in computing resources to prevent the computing performance from being affected during ordinary use. In some embodiments, the results of the background analysis by the agent 123 can be utilized for selecting badges when a folder 201 is loaded (which may or may not be replaced by a subsequent analysis performed upon loading of the folder 201) but not for generating context menu options. As such, the agent 123 may utilize potentially stale data (e.g., historical badges or background identified badges for files 122 in the opened folder 201) to determine badges but require current analysis of policies to provide a context menu items. Similarly, the agent 123 may utilize the potentially stale data (e.g., historical available actions or background identified available actions for a selected file 122) to determine context menu items but require current analysis of policies to execute or perform a selected action.

The determining of the available actions can include the agent 123 performing one or more operations. For example, the agent 123 may determine one or more files 122 included in the folder 201, and determine one or more file metadata corresponding to each of the plurality of files 122. The agent 123 can apply the policies to the files 122 and folders 201 based on the file metadata. The agent 123 can send the file metadata and other formation to the policy server 107 to determine the available actions. The policy server 107 or the agent 123 can identify and retrieve the requested policies 110 based on the file metadata. The policy server 107 can determine the available actions or transmit the policies 110 to the agent 123 for further processing. The agent 123 can evaluate the policies 110 to determine one or more executable actions for each of the files 122 or utilize identified available actions received from the policy server 107. The agent 123 can also evaluate the policies 110 to identify one or more properties or actions as well as one or more badges 401 that corresponds to each identified property/action.

The agent 123 can evaluate each file 122 based on the one or more properties, actions, and badges, and assign a specific one of the badges 401 to the file 122. For example, the agent 123 may determine that a particular file 122 has install, copy, uninstall, and modify actions available based on the policies 110. The agent 123 may determine that a badge 401 associated with the following are available: 1) install, 2) copy, 3) uninstall, 4) modify, 5) install and uninstall; 6) install and modify; and 7) install, copy, and uninstall. The agent 123 may select the badge 401 for 7) as a best-fit candidate even though other badges may also apply. The agent 123 can score each of the available badges to determine the best-fit badge 401. The scoring may be weighted based on predefined criteria and based on likely actions the user may want to take. As an example, the agent 123 may determine that a particular file 122 is already installed and provide a greater weight to an uninstall available action and a modify available action while providing a lesser weight to install available action.

The determined one or more executable actions can be temporarily stored as file 122 metadata in memory 117. In various embodiments, one or more operations of the agent 123 are appropriately performed by various elements of the computing device 103, the performance being caused by the agent 123 instructing the various elements. In some embodiments, the agent 123 can cache the metadata for future evaluations. The cached metadata can be associated with a timeout parameter such that the agent 123 can deem the data is stale once a predefined threshold time passes from when the data is collected.

In one example, based on one or more policies 110, the agent 123 causes the computing device 103 to determine that a particular file is notarized by a trusted authority. The agent 123 may verify the signature or notarization via a third-party service, such as an Apple service or may verify by using a trusted party's public certificate. In other embodiments, the agent 123 may communicate with the trusted party to verify the integrity of the signature. In another example, the agent 123 can determine that an action is available based on one or more factors, such as available resources of the computing device 103, available resources of a network, source of the file 122, or other aspects.

The agent 123 may upload one or more of the files 122 to a remote service for review by an administrator. In one example, the agent 123 may determine that an install action is not available and upload the file to the remote service for consideration by the administration. The remote service may maintain a queue of requested files 122 along with a frequency and count of requests for each file. The queue may be ordered based on statistics associated with each file 122. For example, if a threshold number of user accounts request installation of a particular file 122, the particular file 122 may be ranked higher in the queue. The queue ranking can also factor in an author and source of each uploaded file 122. The remote service can provide a user interface for the administrator to launch a sandbox to perform the actions on the uploaded files 122 and test a result. The administrator can modify one or more policies 110 based on a review of the uploaded files 122. The updated policies 110 can be pushed to the agents 123 on various computing devices 103 so that subsequent badges and context menu items reflect the updated policies 110. In another example, the agent 123 can generate a hash of each file 122 and transmit the hashes to the remote service. The agent 123 can compare the generated hash to one or more of the policies 110 to determine executable and/or available actions.

According to one embodiment, at step 306, the agent 123 can evaluate the policies 110 and determine executable and/or available actions based thereon. The agent 123 may perform this determination of actions at a high-level of granularity compared to similar policy 110 evaluations performed later in the process 300. The granularity-controlled approach may include evaluating only a particular subset of the policies 110 associated with each file 122 to minimize computing resources used to perform the evaluation. Thus, in at least one embodiment, the policies 110 can be assigned to granularity tiers, and the tiers may increase in an average computing cost required to enforce the policies 110 therein.

At step 308, the agent 123 can cause the computing device 103 to render a user interface on the display 125 including an icon for each folder 201. The agent can cause the computing device 103 to render a badge 401 on each icon, the badge 401 being selected based on the determined action or combination of actions associated with each file 122.

At step 310, the computing device 103 receives a selection for a file 122. The selection can be received as a long touch (or click), a right-click, or other input selecting the icon representing the file 122 on the generated user interface. As can be appreciated, the selection can correspond to any type of indication that would cause an underlying operating system to generate a context menu for the selected file 122. For example, the selection may correspond to a non-traditional input device, such as smart-glasses where the user may look at the file 122 for a threshold time to generate the context menu. As another example, the input device may correspond to a pointer device that may point at the file 122 for a threshold time to generate a context menu.

At step 312, the agent 123 determines the available actions for the selected file 122. In some embodiments, the agent 123 may utilize the available actions determined when badges 401 were determined at step 306. The agent 123 may perform a more resource-intensive analysis of the selected file 122 in comparison to step 306. In one embodiment, the agent 123 can query the policy server 107 for policies 110 associated with metadata of the selected file 122 or for a determination of the available actions. The agent 123 can determine one or more executable and/or available actions for the selected file 122 based on applying the policies 110 to the selected file 122. According to one embodiment, the policy 110 evaluation of step 312 is performed at a higher level of granularity than similar operations performed at step 306. The determined one or more executable actions can be temporarily stored as file 122 metadata.

At step 314, the agent 123 causes the computing device 103 to render a context menu 501 on the display 125. The context menu 501 can include an item for each of the determined one or more available actions from step 312 and, in some embodiments, one or more actions associated with other software installed and/or running on the computing device 103. The one or more actions can be rendered as menu entries such as text strings, icons, or combinations thereof. In some embodiments, the one or more actions are added to the context menu 501 via an application programming interface (API) of the operating system 111 and/or via an extension executed by the computing device 103.

According to one embodiment, steps 316-324 are performed if the user selects one of the context menu items corresponding to the determined actions rendered on the context menu 500, as opposed to other actions associated with other software running on the computing device 103. For example, if an available action for install was added to the context menu, but a user selects a "Properties" option from the context menu that was generated by the operating system, steps 316-324 may not be performed. However, if the added context menu item for install is selected, steps 316-324 may be performed.

At step 316, the computing device 103 receives a selection for a determined action included in the context menu 500. The selection can be received similarly to other selections made by a user to provide selections throughout the process 300. The selection may be communicated by the operating system to the agent 123, which may or may not be via an extension. The agent 123 may register to receive a callback for the context menu item. In some embodiments, the API to add the context menu item may include one or more parameters for details of how the agent 123 may receive input when the context menu item is selected. As an example, the agent 123 may provide a callback function or some other means as a parameter to the API.

At step 318, the agent 123 can verify whether the selected action is allowed to be performed according to the policies 110. The agent 123 may query the policy server 107 for permission to perform the selected action, for policies 110 that may be associated with the selected action or user account, or for other information. The agent 123 can verify the selected action is executable and/or available for the user account based on applying the policies 110. According to one embodiment, the evaluation of the policy 110 in step 318 can be performed at a higher level of granularity than similar operations performed at steps 306 and step 312.

At step 320, the agent 123 determines, based on policies 110, whether additional information or input is required before the agent 123 can cause the selected action to be executed on the computing device 103. If the agent 123 determines that additional information or input is required, the process 300 proceeds to step 322. If the agent 123 determines that additional information is not required, the process 300 proceeds to step 326.

At step 322, the agent 123 causes the computing device 103 to prompt the user for additional information. In one example, the agent 123 can render a login window on the display 125, thereby requiring the user to submit credentials for the user account 114 associated with the agent 123. In the same example, the submitted credentials are verified by the agent 123 and a server 107, for example, by comparing the submitted credentials associated with metadata of the user account 114. In another example, the agent 123 can initiate a multi-factor authentication process requiring the user to provide additional forms of authentication, such as responding to a text and/or accessing a particular website on the computing device 103 (or another device). In another example, the agent 123 can cause the computing device 103 to render a challenge-response in response to receiving the selection, and execution of the selection may only occur upon the user providing an appropriate response (e.g., as verified by the agent 123 and/or the server 107). In another example, the agent 123 can transmit the selected action to a remote service for review and authorization by an administrator, the administrator's authorization causing the action to be executed based on a privilege level of the agent 123. In the event that an administrator is unavailable, the remote service can notify or email a user account to try the action again once approved by an administrator. When a subsequent request by the agent is submitted to perform the action a subsequent time, the remote service can automatically grant the request based on a previous administrative authorization. In some embodiments, the server 107 can perform the functionality of the remote service.

In one example, the selected action is a request to install the selected file 122. The agent 123 can determine that an instance of the selected file 122 is already installed on the computing device 103 and automatically prompt the user to confirm that they wish to overwrite or repair the installed instance. In another example, the selected action is a request to delete the selected file 122. The agent 123 can determine one or more other files 122 that require the selected file 122 and automatically prompt the user to confirm that they still wish to delete the selected file 122. In another example, the agent 123 may not prompt the user, but automatically determine, based on the policies 110, whether the computing device 103 is within a predetermined range of a near field communication device, such as a radio frequency identification (RFID) tag or antennae. If the computing device 103 is within the predetermined range, the agent 123 may authorize the action, but otherwise deny the action. In another example, the agent 123 can determine that the policies 110 specify that execution of the action can only occur during a predetermined time window (e.g., as configured by the administrator to prevent unauthorized activities outside of certain windows), and the agent 123 can enforce the time window based on a current time of the computing device 103. In some embodiments, the agent 123 may communicate with one or more identity providers or mobile device management providers to verify the request is allowed to be executed.

At step 324, the agent 123 receives a response from the user and approves the execution of the selected action based on determining that the response satisfies predetermined criteria as established by the policies 110. The agent 123 can apply the policies 110 to the received response to determine compliance therewith, and can also communicate with the computing environment 101, for example, to determine that a particular user action or input occurred and/or is valid.

At step 326, the agent 123 causes the computing device 103 to execute the selected action at the privilege level of the agent 123 or a daemon without changing the privilege level of the user or user account 114. The selected action can include one or more actions including, but not limited to: 1) installing the selected file 122; 2) uninstalling the selected file 122; 3) suspending one or more processes associated with the selected file 122; 4) commencing one or more processes associated with the selected file 122; 5) copying the selected file 122 to a particular folder 201 or other location on the computing device 103; 6) transmitting the selected file 122 to a particular destination; 7) providing another user account 114 access to the selected file 122; 8) downloading other related files; and 9) other actions.

Figure 4:
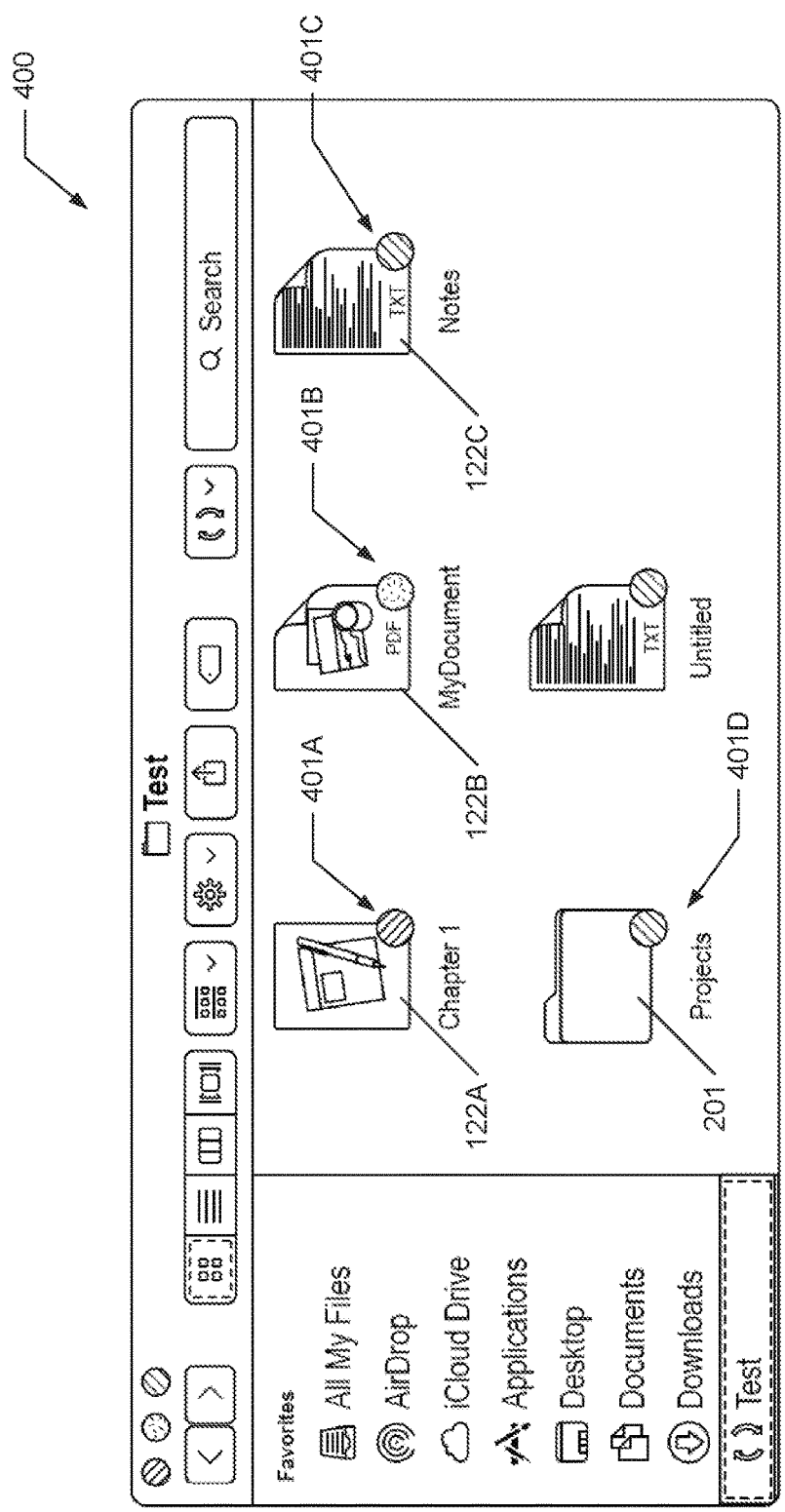
FIG. 4 is a display in a folder of exemplary badges according to one aspect of the present disclosure.
Figure 5A:
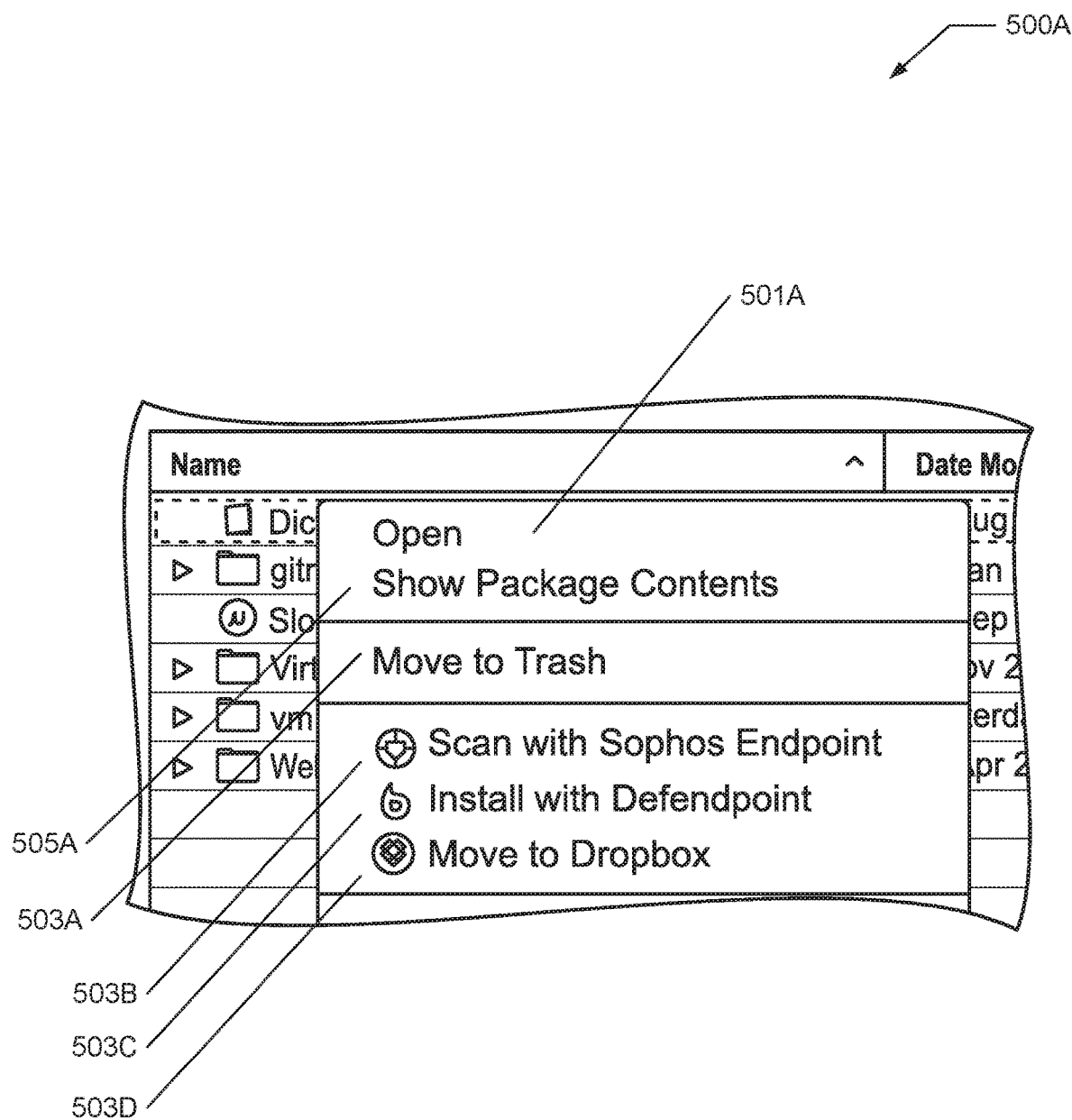
FIG. 5A is an exemplary context menu according to one aspect of the present disclosure.
Figure 5B:
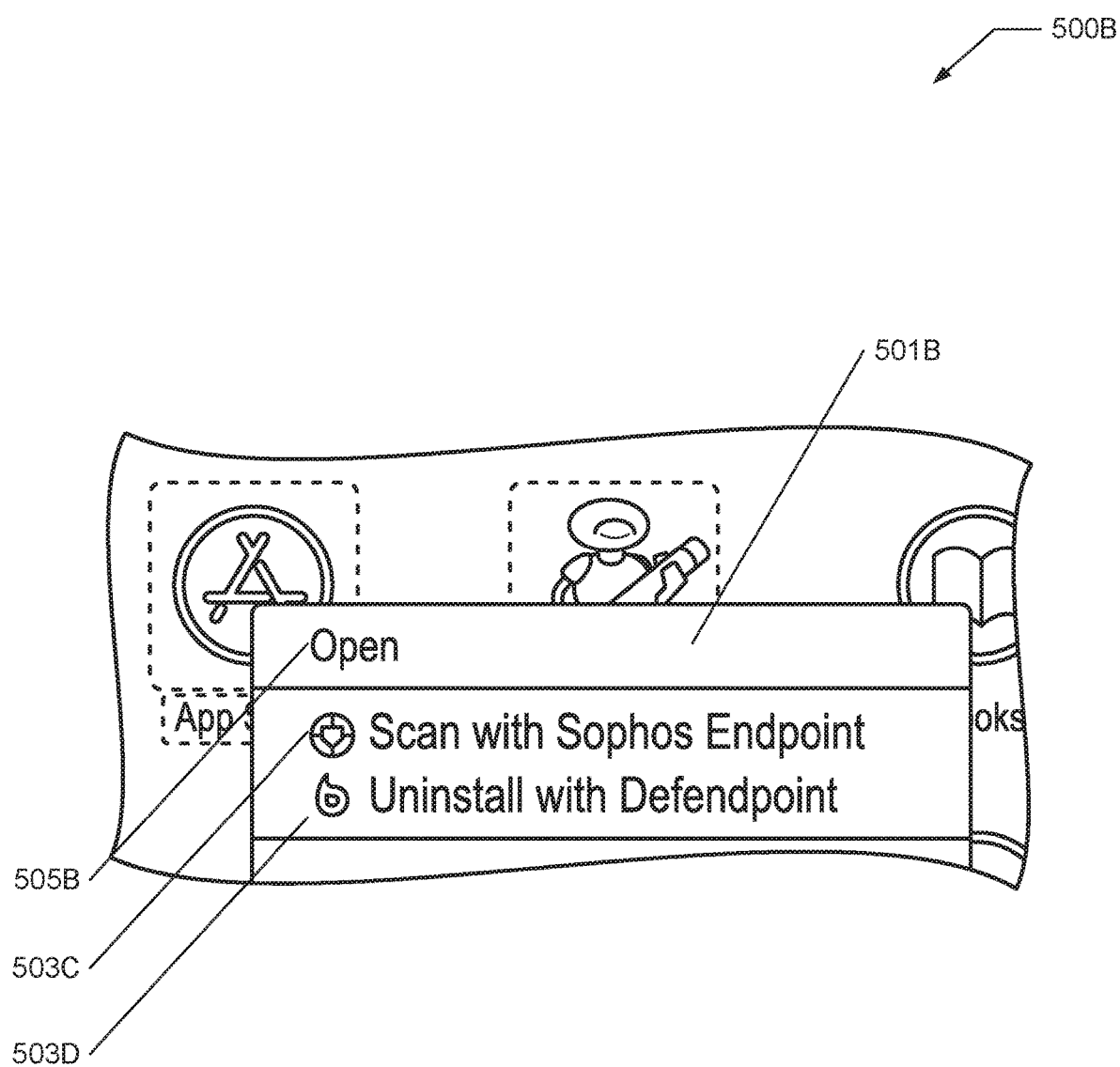
FIG. 5B is an exemplary system context menu according to one aspect of the present disclosure.

With reference to FIG. 4, shown is an exemplary user interface 400 including icons 503A, 503B, 503B, 503D, 503E that represent a folder 201 and one or more files 122. The user interface 400 can be rendered on a display 125 in response to the user selecting a folder 201 in a higher-level instance of the user interface 400. The icons 503A-E can each include a badge 401A, 401B, or 401C (or other badge 401). Each badge 401 can include a particular pattern, color, indicia, or a combination thereof. The badge 401 rendered with the icon 503 can be determined based on one or more executable and/or available actions associated with the particular folder 201 or file 122 that the icon 503 represents. The executable and/or available actions are determined via the agent 123 as discussed herein. Combinations of executable and/or available actions can be represented by badges 401 that are different from badges 401 that represent each action individually. The rendered badges 401 allow the user to quickly and readily identify approximate actions that can be performed with each folder 201 or file 122 via the agent 123.

In one example, badge 401A corresponds to an uninstall action, thereby indicating that the user may select an uninstall action causing uninstallation of the file 122A via the agent 123 and a privilege level associated therewith. In another example, the badge 401B includes a green color, thereby indicating that the user can select an install action causing installation of the file 122B via the agent 123. In another example, badge 401C includes a right-striped pattern, thereby indicating that the user can select a copy action causing the file 122C to be copied to one or more locations on the computing device 103. In an alternate example, the badge 401C includes a red color, thereby indicating that the user cannot select any actions to be executed on the file 122C at the privilege level of the agent 123 (e.g., without prejudice to other actions associated with a privilege level equal to or less than the user's privilege level). In some embodiments, the user interface 400 includes a legend, table, or other visual interpretation that indicates the relationship between each badge color, symbol, pattern, etc. and executable actions. The legend can be initially hidden from the user and rendered upon the user selecting a "display legend" button or providing a functionally equivalent input to the computing device 103. The relationships between the badges 401 and actions can be stored on the computing device 103 or in the computing environment 101. In some embodiments, the legend or a specific action can be rendered in a popup window when a cursor hovers over a badge 401.

With reference to FIG. 6A, shown is an exemplary user interface 500A including a context menu 501A. In at least one embodiment, the context menu 501A is rendered via the agent 123 and/or an extension in response to receiving a selection from a user for a particular folder 201 or file 122. The context menu 501A can be rendered on a user interface 400, or another user interface.

The context menu 501A can include selectable and executable actions 503A, 503B, 503C, and 503D that are rendered in response to determinations made via the agent 123 based on policies 110 associated with the particular folder 201 or file 122. The selectable actions 503A, 503B, 503C, and 503D can include text, icons, or combinations thereof. The text and/or icons can describe the particular action. The context menu 501A can include other actions 505 that are not associated with a privilege level. In one example, selectable actions 503 include "move to trash," "scan with a first software application," "install," and "move to location," and the other action 505A includes "show contents," among other actions associated with a privilege level of the user or user account 114. Upon the user selecting one of the actions 503, the agent 123 can cause or not cause the computing device 103 to execute the selected action (e.g., based on policies 110 and/or additional user prompts.

With reference to FIG. 6B, shown is a context menu 501B including selectable and executable actions 503C and 503D. The context menu 501B can further include other actions 505, such as the action 505B shown.

The example mechanism has many benefits and advantages, as will now be appreciated from the discussion herein. In particular, installation of an application for each computer device in the network is managed more efficiently and with enhanced functionality. Application control typically determines whether or not to allow execution of an installed application, whereas the present mechanism takes control further upstream including the initial action of mounting the disk image. Thus, the mechanism better avoids downstream problems, such as mounting unauthorized disk images. Resultant issues are also addressed, such as unnecessary consumption of storage space on the computer device by mounting of disk images containing unauthorized applications.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

The example embodiments are discussed in detail in relation to computer devices using UNIX or Unix-like operating systems, including particularly the 'macOS' family of operating systems (known previously as "OS X" and before that "Mac OS X") provided by Apple, Inc. of Cupertino, Calif., USA. As will be familiar to those skilled in the art, Unix-like operating systems include those meeting the Single UNIX Specification ('SUS'), along with similar systems such as implementations of Linux, BSD and several others. Hence, the teachings, principles and techniques as discussed below are also applicable in other specific example embodiments. In particular, the described examples are useful in many computer devices having a security model that employs discretionary access control. According to various aspects of the present disclosure, the example embodiments discussed herein may also be implemented on computer devices using the "Windows" operating systems, or other appropriate operating systems.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A system comprising:

at least one computing device; and an agent that, when executed by the at least one computing device, causes the at least one computing device to:

register with an operating system during a boot sequence;

determine a plurality of files stored in a particular folder;

determine a plurality of file metadata individually corresponding to individual ones of the plurality of files based at least in part on a policy file, wherein at least one of the plurality of file metadata comprises a setting of whether a corresponding file of the plurality of files is installable or deletable;

receive a selection of a particular file of the plurality of files, the particular file corresponding to a respective one of the plurality of file metadata;

determine an availability of at least one action for the particular file as specified by the plurality of file metadata;

render a context menu comprising a plurality of menu entries, the plurality of menu entries comprising at least one additional menu entry that corresponds to the at least one action based at least in part on the respective one of the plurality of file metadata; and upon selection of the at least one additional menu entry, cause the at least one action to be performed based on privileges of the agent.

2. The system of claim 1, wherein the agent further causes the at least one computing device to determine that the particular file is notarized by a trusted authority, wherein the plurality of menu entries comprising the at least one additional menu entry further based at least in part on determining that the particular file is notarized by the trusted authority.

3. The system of claim 1, wherein the at least one additional menu entry corresponds to the at least one action that is available.

4. The system of claim 1, wherein the agent further causes the at least one computing device to:

prior to receiving the selection, determine a plurality of availabilities of at least one action for individual ones of the plurality of files as specified by the plurality of file metadata.

5. The system of claim 1, wherein the agent further causes the at least one computing device to add the at least one additional menu entry via an application programming interface of the operating system.

6. The system of claim 1, wherein the agent further causes the at least one computing device to:

receive a second selection of the at least one additional menu entry, wherein the at least one additional menu entry corresponds to requesting a review of the particular file; and upload the particular file to a remote service for the review by an administrator.

7. The system of claim 1, wherein the agent further causes the at least one computing device to:

load the policy file from a policy server; and store the policy file on a local storage device.

8. A system comprising:

an agent; and at least one computing device configured to execute the agent to:

register with an operating system during a boot sequence;

determine a plurality of files stored in a particular folder;

determine a plurality of file metadata individually corresponding to individual ones of the plurality of files based at least in part on a policy file, wherein at least one of the plurality of file metadata comprises a setting of whether a corresponding file of the plurality of files is installable or deletable;

determine a respective availability of a plurality of actions for each of the plurality of files as specified by the plurality of file metadata;

generate a user interface for the particular folder comprising a plurality of icons individually corresponding to the plurality of files, wherein individual ones of the plurality of icons comprise a respective badge selected based at least in part on the respective availability for the individual ones of the plurality of files; and cause a particular action of the plurality of actions to be performed on a particular file of the plurality of files based on the respective availability of the particular action and the respective badge corresponding to the particular file according to privileges of the agent.

9. The system of claim 8, wherein the agent further causes the at least one computing device to determine the plurality of file metadata by querying a policy server for the plurality of file metadata.

10. The system of claim 8, wherein the agent further causes the at least one computing device to:

determine, for each of the plurality of files, the respective badge by:

determining at least one respective property for each of the plurality of files as specified in the respective one of the plurality of file metadata; and selecting the respective badge from a plurality of predefined badges based at least in part on the at least one respective property.

11. The system of claim 10, wherein the plurality of predefined badges comprises a first subset of badges individually corresponding to the plurality of actions and a second subset of badges individually corresponding to at least one combination of two or more of the plurality of actions.

12. The system of claim 8, wherein the agent further causes the at least one computing device to:

receive a selection of the particular file of the plurality of files, the particular file corresponding to a respective one of the plurality of file metadata; and render a context menu comprising a plurality of menu entries, the plurality of menu entries comprising at least one additional menu entry based at least in part on the respective one of the plurality of file metadata.

13. A method, comprising:

registering, via an agent executed by at least one computing device, with an operating system during a boot sequence;

determining, via the agent, a plurality of files stored in a particular folder;

determining, via the agent, a plurality of file metadata individually corresponding to individual ones of the plurality of files based at least in part on a policy file, wherein at least one of the plurality of file metadata comprises a setting of whether a corresponding file of the plurality of files is installable or deletable;

receiving, via the agent, a selection of a particular file of the plurality of files, the particular file corresponding to a respective one of the plurality of file metadata;

determining, via the agent, an availability of at least one action for the particular file as specified by the plurality of file metadata;

modifying, via the agent, a context menu by adding at least one additional menu entry that corresponds to the at least one action to at least one existing menu entry, the at least one additional menu entry being selected based at least in part on the respective one of the plurality of file metadata; and upon selection of the at least one additional menu entry, cause the at least one action to be performed based on privileges of the agent.

14. The method of claim 13, further comprising:
receiving, via the agent, a second selection of the at least one additional menu entry;
generating, via the agent, a hash of at least a portion of the particular file;
performing, via the agent, a comparison of the hash against the respective one of the plurality of file metadata; and
determining, via the agent, an action to take based at least in part on the comparison.

15. The method of claim 13, further comprising:
receiving, via the agent, a second selection of the at least one additional menu entry; and
requesting, via the agent, a challenge-response in response to receiving the selection.

16. The method of claim 13, further comprising:
receiving, via the agent, a second selection of the at least one additional menu entry; and
causing the particular file to be installed on the at least one computing device based at least in part on privileges of the agent without changing privileges of a current user account.

17. The method of claim 16, wherein the method further comprises:
identifying that a second particular file matching the particular file is installed on the at least one computing device; and
in response to the identification, automatically prompting a user to confirm an overwrite authorization of the second particular file.

18. The method of claim 13, further comprising:
receiving, via the agent, a second selection of the at least one additional menu entry; and
causing, via the agent, the particular file to be deleted from the at least one computing device based at least in part on privileges of the agent without changing privileges of a current user account.

19. The method of claim 13, further comprising:
receiving, via the agent, a second selection of the at least one additional menu entry;
determining, via the agent, that a second factor authentication is required by the respective one of the plurality of file metadata;
performing, via the agent, the second factor authentication for a current user account; and
in response to performing the second factor authentication, causing the particular file to be installed on the at least one computing device based at least in part on privileges of the agent without changing privileges of the current user account.

20. The method of claim 19, wherein the second factor authentication comprises determining whether another computing device is within a near field communication range of the at least one computing device.

21. The method of claim 19, wherein the method further comprises determining, via the agent, that the causing of the particular file to be installed occurs during a predetermined time window.

22. The method of claim 19, wherein the method further comprises:
identifying an installed instance of the particular file;
prompting a user to confirm an over-write of the installed instance of the particular file; and
based on receiving a confirmation, causing the at least one computing device to overwrite the installed instance of the particular file.

* * * * *